United States Patent [19]

Ellis

[11] Patent Number: 5,074,828
[45] Date of Patent: Dec. 24, 1991

[54] COMPOSITE POWER TRANSMISSION WHEEL

[75] Inventor: Paul R. Ellis, Denver, Colo.

[73] Assignee: The Gates Rubber Company, Denver, Colo.

[21] Appl. No.: 509,003

[22] Filed: Apr. 13, 1990

[51] Int. Cl.⁵ ............................................. F16H 55/06
[52] U.S. Cl. .................................................. 474/161
[58] Field of Search ............... 474/152, 161, 166, 190, 474/161, 166, 152; 74/DIG. 10; 29/893, 893.37; 106/36

[56] References Cited

U.S. PATENT DOCUMENTS

| | | | |
|---|---|---|---|
| 3,756,091 | 9/1973 | Miller | 74/231 C |
| 3,964,328 | 6/1976 | Redmond, Jr. | 74/231 C |
| 4,078,445 | 3/1978 | Kiser, Jr. | 74/243 R |
| 4,244,847 | 1/1981 | Posivata et al. | 260/17.4 CL |
| 4,413,860 | 11/1983 | Prescott | 301/63 PW |
| 4,433,964 | 2/1984 | Holtzberg et al. | 474/152 |
| 4,458,547 | 7/1984 | Fina | 74/460 |
| 4,514,179 | 4/1985 | Skura | 474/204 |

FOREIGN PATENT DOCUMENTS 57-6154   1/1982   Japan .

OTHER PUBLICATIONS

*Machine Design*—Oct. 13, 1988 Issue, "Plastic Gears", (No Author), p. 34.
*Machine Design*—Jan., 21, 1988 Issue, "More Bite for Plastic Gears", Paul J. Dvorak, pp. 75-80.

*Primary Examiner*—Ramon S. Britts
*Assistant Examiner*—Roger J. Schoeppel
*Attorney, Agent, or Firm*—H. W. Oberg; C. H. Castleman, Jr.

[57] ABSTRACT

A power transmission wheel of the gear wheel sprocket wheel and pulley wheel type has hub portion or rim portion formed of a composite material of discontinuous fiber disposed in a plastic matrix where teeth are formed in one of the portions so as to define flank surfaces and where lateral side portion of fiber follow the contour of the surface so as to minimize in portions of fiber at ends the flank surfaces. A method for manufacturing a power transmission wheel by winding a strip of uncured material having embedded discontinuous lengths of fiber, and winding the strip in a volute fashion to form a preform having oppositely facing sides, and pressing the preform on one side and shaping the preform, and heating the preform to define a power transmission wheel.

17 Claims, 3 Drawing Sheets

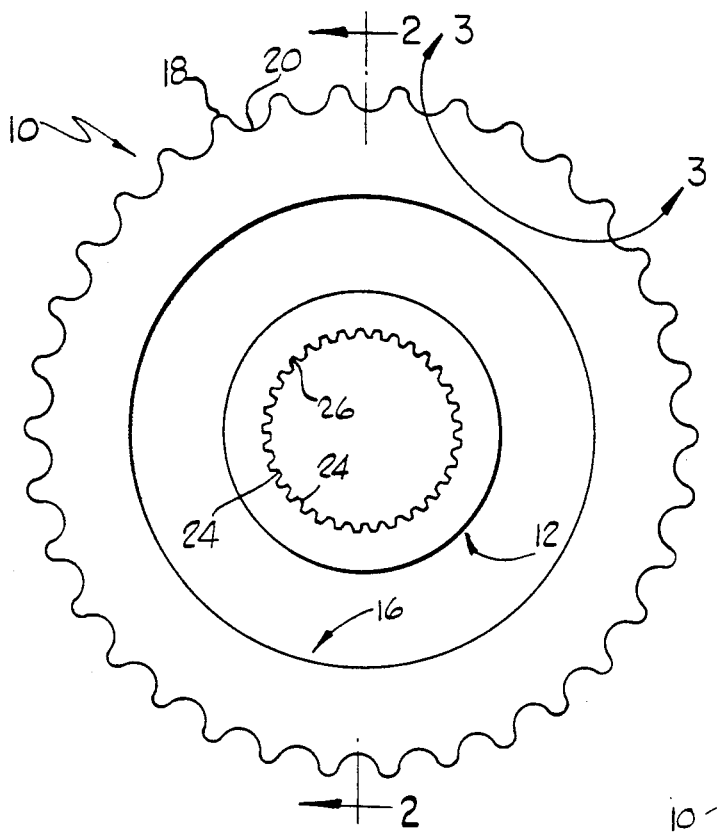
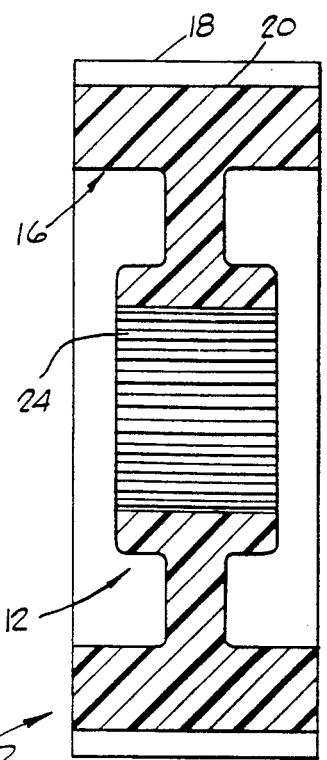
FIG.1
FIG.2
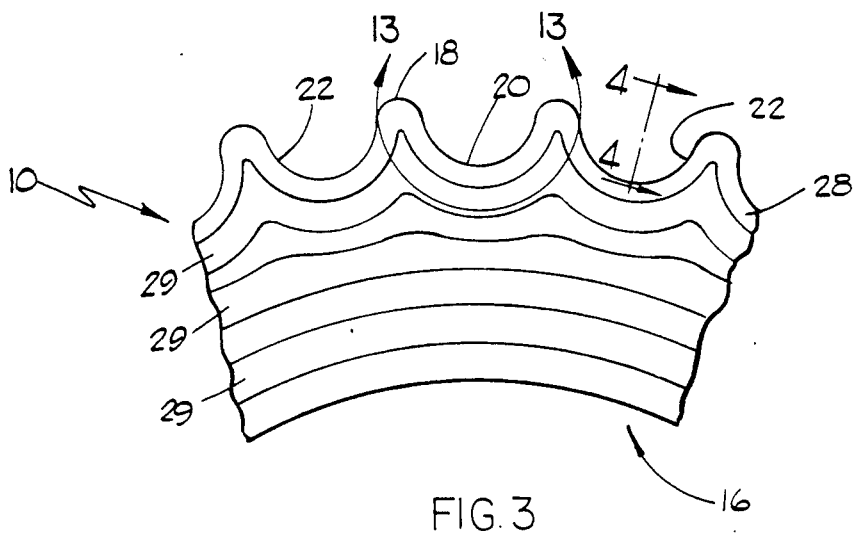
FIG.3

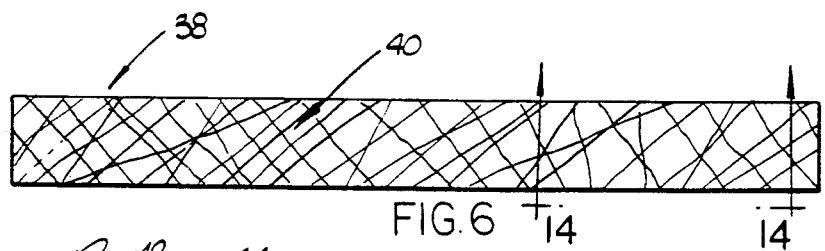
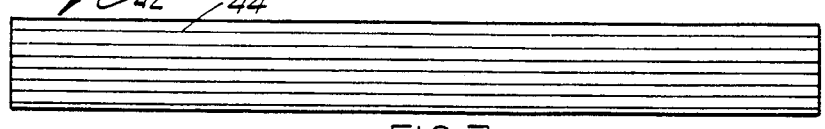
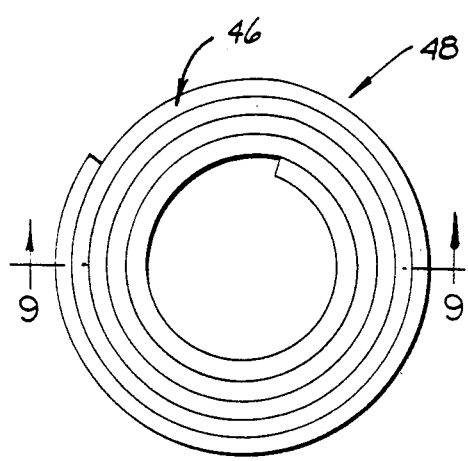
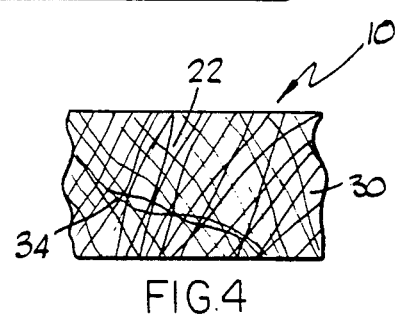
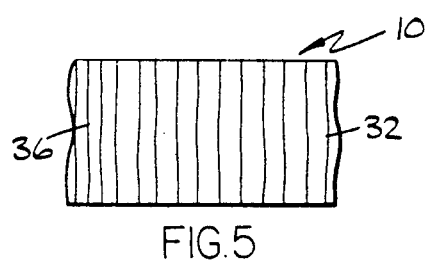
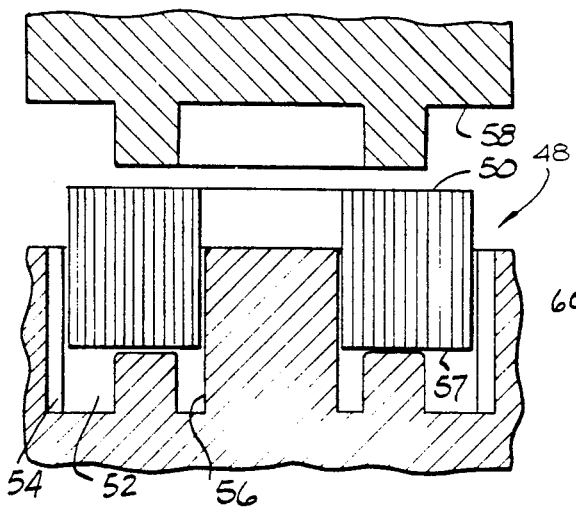
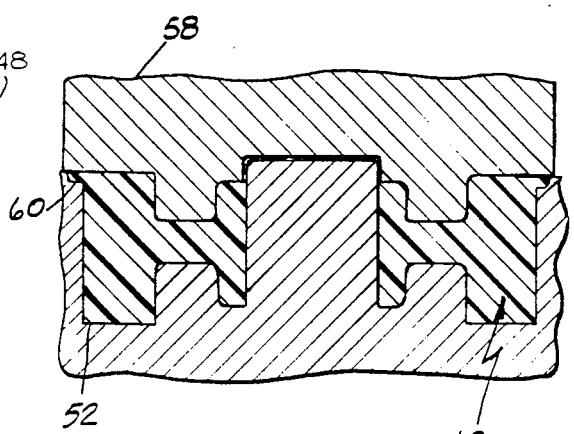

COMPOSITE POWER TRANSMISSION WHEEL

BACKGROUND OF THE INVENTION

The invention relates to machine elements and mechanisms but more particularly, the invention relates to improved power transmission wheels such as gear wheels, sprocket wheels, and pulley wheels having a plurality of teeth formed of a plastic-fiber composite material.

There are several types of power transmission wheels such as gear wheels, sprocket wheels, and pulley wheels which have a power transmission surface or layer that is formed from a composite material of plastic and embedded fibers. Some power transmission wheels are formed totally of the composite material while others may include a metallic insert which forms a hub portion and where the composite material is used in a rim portion. An example of such composite materials include fabrics impregnated with a phenolic resin. Another composite material that has the advantage of being capable of being molded by thermoplastic injection molding is a composite material of nylon reinforced with milled glass fibers having a length of 1/16 in. or less. While a thermal plastic injected nylon material containing a 40 weight percent of nylon fiber is effective for use in many power transmission wheel applications, such composite materials are not suited for high-power, long-life applications where it is customary to use materials such as cast iron and powdered metal. Power transmission wheels of cast iron are designed using material strengths from about 30,000 to 60,000 psi tensile strength. A characteristic of composites with milled glass fibers is that there are end portions of fiber juxtaposed the power transmission surface of the power transmission wheel that may lead to early failure of a component part such as a power transmission belt. In the case of phenolic composites, the power transmission surface is typically machined or molded and then worn through exposing end portions of embedded fiber.

An example of where a composite of nylon and milled glass fiber is inadequate because of component failure and where sprockets of iron are typically used is in a power transmission system of the type that uses toothed belts that engage sprockets where the belt and sprocket teeth are of the type as disclosed in U.S. Pat. No. 4,605,389 to Westof and where the belt is of the cast urethane type with an elastomer free surface construction as disclosed in U.S. Pat. No. 3,964,328 to Redmond.

Examples of various types of plastic gears and problems associated therewith are summarized in the Jan. 21, 1988 and Oct. 13, 1988 issues of Machine Design.

SUMMARY OF THE INVENTION

A power transmission wheel such as a gear wheel, sprocket wheel, and pulley wheel is provided in accordance with the invention. The wheel has a hub portion and a rim portion where one or both of the portions is of a composite material having a tensile strength of at least 35,000 psi as formed from a plastic matrix with embedded fibers having a length of at least 0.5 inches. The fibers are laid down in an epoxy layer where the layers have lateral side portions that follow the contour of the wheel's power transmission surface such as the contour of teeth.

An object of the invention is to provide a component power transmission wheel using a composite where materials such as cast iron and ductile iron were formerly used.

Another object of the invention is to provide a component sprocket wheel that is compatible with a toothed belt of a power transmission system.

Another object of the invention is to provide a power transmission wheel using composite materials for a hub attachment where formerly metals such as cast and ductile iron are used.

A method of making a power transmission wheel is disclosed where an uncured strip of plastic material containing embedded fibers having a length of at least 0.5 inches is wound in a spiraling volute fashion to form a mold preform, inserting the preform into a compression mold cavity having adjacent teeth at a rim portion or a hub portion; and compression molding the preform to define a gear wheel with radially outward lateral side portions of fibers juxtaposed a tooth surface.

Another object of the invention is to provide a method of manufacturing a gear wheel using a composite so as to expose radially outward lateral side portions of an embedded fiber juxtaposed flank surfaces of teeth.

Yet another object of the invention is to minimize exposure of end portions of embedded fiber juxtaposed flank surfaces of teeth of a sprocket wheel.

An advantage of the invention is that a moldable composite material can be used in power transmission wheels where metals such as cast or ductile iron were formerly used.

Still another advantage of the invention is that in a sprocket and toothed belt combination of a power transmission system, sprockets of the invention having teeth of composite material exhibit substantially improved performance over sprockets having teeth of cast or ductile iron.

These and other advantage of the invention will be realized after reviewing the drawings and description thereof wherein:

FIG. 1 is a front view of a power transmission wheel in the form of a sprocket made in accordance with the invention:

FIG. 2 is a view taken along the line 2—2 of FIG. 1;

FIG. 3 is an enlarged partial view taken along the line 3—3 of FIG. 1;

FIG. 4 is a partial inclined plan view taken in the direction of 4—4 of FIG. 3 and showing a flank concave surface of a transparent layer of a tooth and the orientation of discontinuous fiber;

FIG. 5 is a view similar to FIG. 4 and showing another embodiment of the invention;

FIG. 6 is a top view of a strip of uncured composite with random orientation of discontinuous fiber;

FIG. 7 is a view similar to FIG. 6 but showing a composite material with oriented discontinuous fibers extending lengthwise throughout the length of the strip;

FIG. 8 is a mold preform where the strips of fiber of FIG. 6 or 7 are spirally wound in volute fashion forming encircling layers;

FIG. 9 is a cross-sectional view taken in the direction of 9—9 of FIG. 8 and showing the preform inserted into a mold cavity;

FIG. 10 is a view similar to FIG. 9 and showing the preformed molded in a compression mold cavity to define the sprocket wheel of FIG. 1.

DESCRIPTION OF PREFERRED EMBODIMENTS

Figure 11:
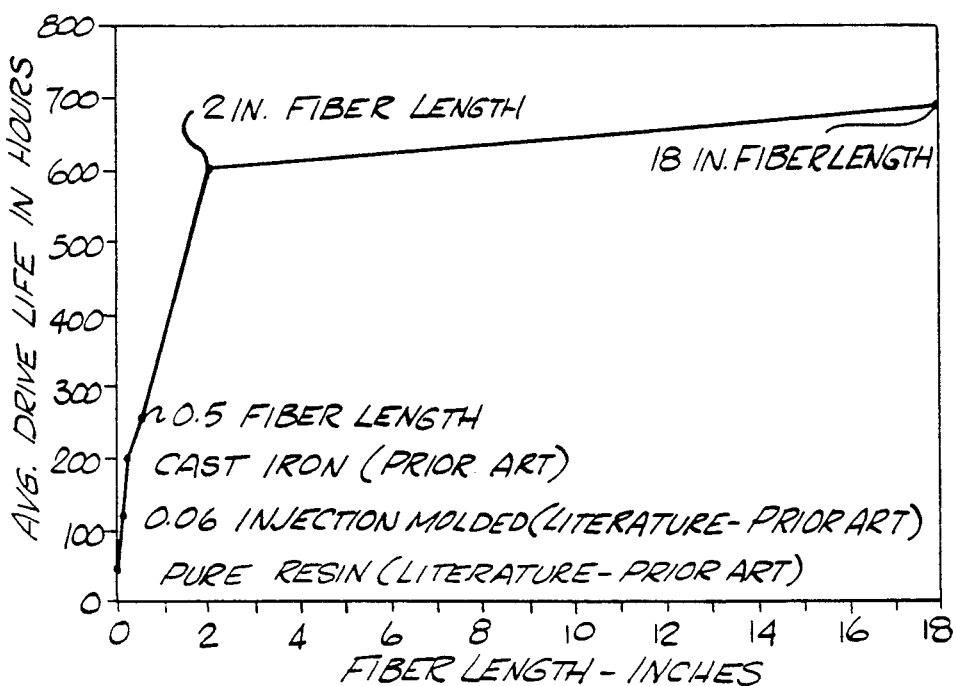
FIG. 11 is a chart showing performance of a sprocket wheel for different lengths of embedded fiber.

Referring to FIGS. 1-5, a power transmission wheel of the invention is provided in the form of a sprocket 10 for use with a toothed belt. The sprocket has a hub portion 12 and a rim portion 16. A plurality of belt engaging teeth 18 and grooves 20 are formed in the rim where the teeth have flank surfaces 22. A plurality of internal teeth 24 in the form of a spline are formed in the hub portion. The teeth 24 have flank surfaces 26 for engaging and receiving power form a splined shaft, not shown.

The sprocket is formed with at least one encircling layer of composite material 28 that follows the contour of the teeth, and more preferably there are several successive encircling layers 29 of composite material as particularly illustrated in FIG. 3.

The composite material is of a plastic matrix with an embedded fiber. The composite has a tensile strength of at least 35,000 psi as derived from the combination of the plastic and embedded fiber and where the fiber is of the discontinuous type with lengths of at least 0.5 inches. The plastic matrix may be of any desired type such as epoxy and vinyl ester. Similarly the embedded fiber may be of any desired type such as aramid fiber, fiberglass and carbon fiber. However, the resultant composite of chosen plastic and fiber must exhibit a tensile strength of at least 35,000 psi.

The fiber may be randomly oriented 30 as intended to be illustrated in FIG. 4, or the fiber may be directionally oriented 32 as illustrated in FIG. 5. In either case, the encircling layer follows the contour of the teeth so that the embedded fiber 30, 32 have lateral generally radially inward and outward side surface portions 34, 36, within each layer that substantially follow the contour of the encircling layer. As shown, the fibers located in the side surfaces of each layer are juxtaposed the flank surfaces of the teeth. Different encircling layers may be used. For example, the encircling layer at the hub portion may be of randomly oriented fiber, and the encircling layers at the rim portion may be with directionally oriented fiber. In either case, it is preferred that the fibers of the successive layers in the rim and hub portions have side surfaces substantially facing each other such as when the successive layers are in the form of substantially a spirally wound volute. The volute winding places the fibers within adjacent layers in a side-by-side proximity and orients the fibers substantially in the direction of the encircling layer. Preferably the fiber has a minimum length that is greater than a peripheral length of an individual tooth as measured along an end cross-section of the wheel as shown in FIG. 3. Such a minimum length enhances the lengthwise two-dimensional positioning of lateral side portions of fiber, instead of end portions of fiber, at the tooth flank surfaces. More preferably, the fiber has a length that is greater than the peripheral length of two or more teeth. Most preferably the fiber has a length that encircles the periphery of the entire wheel.

While various plastic-fiber composite combinations may be used, composites sold under the trademark Lytex as manufactured by Quantum Composites, Inc. have been shown to be effective for the power transmission wheels of the invention. Lytex Product No. 9063 is for randomly oriented fiber glass disposed in a epoxy matrix, and Lytex Product No. 4105 is for 18 in. continuous fiber glass directionally oriented and disposed in an epoxy matrix. The advantage of these materials is that they can be loaded into a plastic matrix at higher weight percents than are unattainable with the milled glass fibers. Weight percents of sixty percent (60%) are attainable with the ½ in. glass fiber to yield a composite having a tensile strength of 35,000 psi. A 60% by weight of 2 in. glass fiber yields a tensile strength of approximately 44,000 psi. Composites with the 18 in. continuous fibers glass approach tensile strengths of infinite fiber lengths. A seventy percent (70%) by weight is possible with the substantially continuous fiber where the tensile strength may be 100,000 psi or greater. The advantage of these composite materials is that they are equal to or greater than the tensile strength of cast or ductile iron which is considered to be a desired material for power transmission wheels.

Method

A power transmission wheel such as the sprocket of FIGS. 1-5 made in accordance with the method of the invention is illustrated in FIGS. 6-10. A strip 38 of uncured composite having randomly disbursed fibers 40, or a strip 42 of uncured composite having directionally oriented fibers 44, or combinations thereof, may be used. A power transmission wheel is made by encircling at least one of the strips of composite material such as by spiraling in volute fashion and thereby applying together a plurality of generally concentric layers 46 to form a cylindrically shaped mold preform 48 having oppositely facing sides 50 and 57. The preform such as shown in FIG. 8 is placed in a mold cavity 52 for a power transmission wheel which has a rim portion 54 and a hub portion 56. The preform 48 is pressed by means of mold part 58 on at least one side of the preform 48 which reshapes the preform to fill the mold cavity as shown in FIG. 10. The encircling layering of the volute between the hub and rim is disrupted by the pressing operation; however, the encircling layering remains substantially intact at the hub and rim portions. The mold cavity and preform are heated which cures the epoxy material of the composite to define a molded power transmission wheel. The molding process forms a plurality of spaced, circumjacent teeth in the rim portion and, optionally, may form an integral radial flange 60 adjacent to at least one side of the teeth as is illustrated in FIG. 10. The strips of epoxy material may be partially precured so that they will exhibit some shape retention when making the preform. When a splined shaft is desired, the teeth are internally formed along the hub during the molding process.

To illustrate the improvements derived from the invention, several sprockets were manufactured with various lengths of fiber. All sprockets had substantially the same configuration and were tested as part of a power transmission system where the sprocket teeth and belt teeth were of the type as disclosed in U.S. Pat. No. 4,605,389 to Westof and where the belt was of the cast polyurethane type with an elastomer free surface as disclosed in U.S. Pat. No. 3,964,328 to Redmond. The various types of sprockets and belt were tested on a dynamometer at 18 horsepower and 1800 rpm. The belt and sprocket teeth had a pitch of 8 mm. FIG. 11 discloses the results of such testing. As shown, the sprockets of the invention with embedded fiber of at least 0.5 in. had improved performance over that of cast iron and had a substantially improved performance over sprockets of pure resin or where milled glass was used as the embedded reinforcement. Sprockets with 2 in. randomly oriented fiber exhibited a life of approximately 600 hours whereas sprockets made with substantially continuous length fibers of 18 in. exhibited an average life of about 700 hours. Longer length fibers such as 36 in. may be used. To minimize the possibility of exposed fiber ends, it is preferable that the fiber length be one and one-half times the peripheral circumferential surface length of the gear wheel.

ADDITIONAL EMBODIMENTS

Figure 12:
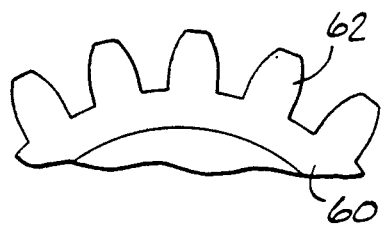
FIG. 12 is a partial view similar to that of FIG. 3 but showing an alternate form of a wheel of the invention.
Figure 13:
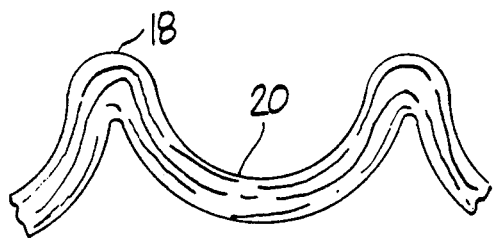
FIG. 13 is an enlarged partial elevation view taken along the line 13—13 of FIG. 3 schematically showing fibers of a layer of the type of the strip of FIG. 6, with generally radially inward and outward side surfaces that substantially follow the contour of the contoured encircling layer.
Figure 14:
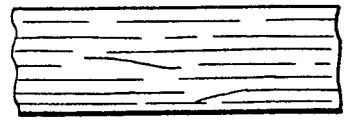
FIG. 14 is an enlarged partial view taken along the line 14—14 of FIG. 6 schematically showing orientation of the side surfaces of the fibers.

FIG. 12 shows a power transmission wheel 60 with teeth in the form of gear teeth 62 as defined in a rim portion.

The foregoing detail description is provided for purposes of illustration only and it is not intended to limit the scope of the invention which is to be determined by the appended claims.

I claim:

1. In a power transmission wheel selected from the group consisting of gear wheels, sprocket wheels and pulley wheels, and with a hub portion having a width and a rim portion having a width wherein at least one of said portions is of a composite material of fiber dispersed in a plastic matrix and wherein the improvement comprises:
    a plurality of successive encircling layers of composite material in the rim portion, the layers generally in the form of a volute and generally concentrically and circumferentially oriented in relation to the wheel and spanning substantially the width of the rim portion, the layers including a plastic matrix;
    a plurality of fibers embedded in the plastic matrix having a length of at least 0.5 in., and a percent by volume loading in the matrix from at least about 60 percent; and
    wherein the plastic matrix and fiber define a composite material having a tensile strength of at least 35,000 psi, and where a majority of the fibers within each layer have generally radially inward and outward side surfaces that substantially follow the contour of the contoured encircling layers.

2. The power transmission wheel as claimed in claim 1 wherein the composite material has a tensile strength of at least 44,000 psi.

3. The power transmission wheel as claimed in claim 1 wherein the composite material has a tensile strength from about 35,000 psi to about 100,000 psi.

4. The power transmission wheel as claimed in claim 2 wherein the rim portion has a plurality of spaced circumjacent teeth having flanks and wherein the fibers have side surfaces that face the flank surfaces.

5. The power transmission wheel as claimed in claim 1 wherein the hub portion includes a plurality of successive layers of composite material generally concentrically and circumferentially oriented in relation to the wheel and extending across the wheel, the layers including a plastic matrix and a plurality of fibers disposed in the plastic matrix, the hub portion having a plurality of spaced circumjacent internal teeth that define a spline and wherein the fibers in the hub portion have side surfaces that face flank surfaces of the teeth.

6. The power transmission wheel as claimed in claim 1 wherein the fiber is fiberglass.

7. The power transmission wheel as claimed in claim 1 wherein the plastic is selected from the group of an epoxy and vinylester.

8. The power transmission wheel as claimed in claim 1 wherein the fibers in the rim portions have lateral side surfaces substantially facing each other.

9. The power transmission wheel in claim 1 wherein the fibers of a layer are randomly oriented.

10. The power transmission wheel as claimed in claim 5 wherein fibers in a layer of the rim portion have lateral side surfaces substantially facing each other and fibers in a layer of the hub portion are randomly oriented.

11. In a power transmission wheel made of a composite material of discontinuous fiber glass dispersed in a plastic matrix, the wheel having a hub portion and a rim portion and wherein the improvement comprises:
    a plurality of successive and contoured encircling layers a majority of which are generally of a volute, the layers of composite material generally concentric and circumferentially oriented in relation to the wheel and extending at least across a major part of the wheel, each layer including fibers having a length of at least about 0.5 in. and occupying at least 60 percent by weight of the matrix and wherein the composite has a tensile strength of at least 35,000 psi; and
    a plurality of spaced, circumjacent teeth having flanks and formed at a periphery of one of said portions.

12. The power transmission wheel as claimed in claim 11 wherein the fibers of a layer are randomly dispersed and have lateral side portions that substantially follow the contour of the layer.

13. The power transmission wheel as claimed in claim 11 wherein the fibers of a layer are dispersed in side-by-side proximity and are oriented in the direction of the encircling layer.

14. The power transmission wheel as claimed in claim 13 wherein an encircling layer at the periphery of one of said portions has fibers with lateral side portions facing the flank surfaces of the circumjacent teeth.

15. The power transmission wheel as claimed in claim 13 wherein the minimum length of the fiber is greater than a peripheral length of a tooth as measured along an end cross section of the wheel.

16. The power transmission wheel as claimed in claim 11 wherein the teeth are external and formed at the rim portion.

17. The power transmission wheel as claimed in claim 11 wherein the teeth are internal and formed at the hub portion and define a spline.

* * * * *